United States Patent [19]

Maeda et al.

[11] Patent Number: 4,550,394
[45] Date of Patent: Oct. 29, 1985

[54] SYSTEM FOR OPTICALLY RECORDING INFORMATION

[75] Inventors: Takeshi Maeda, Kokubunji; Masahiro Takasago, Odawara; Yoshito Tsunoda, Mitaka, all of Japan

[73] Assignee: Hitachi, Ltd., Tokyo, Japan

[21] Appl. No.: 479,894

[22] Filed: Mar. 29, 1983

[30] Foreign Application Priority Data

Mar. 31, 1982 [JP] Japan ................... 57-51234

[51] Int. Cl.$^4$ ................... G11B 7/00; G11B 21/10
[52] U.S. Cl. ................... 369/46
[58] Field of Search ........... 369/44, 45, 46, 47, 369/48, 111, 275; 346/76 L

[56] References Cited

U.S. PATENT DOCUMENTS

| | | | |
|---|---|---|---|
| 4,136,362 | 1/1979 | Naruse et al. | 369/44 |
| 4,243,850 | 1/1981 | Edwards | 369/46 |
| 4,298,974 | 11/1981 | Tsunoda et al. | 369/45 |
| 4,414,655 | 11/1983 | Shoji et al. | 369/44 |
| 4,423,495 | 12/1983 | Musha et al. | 369/45 |
| 4,443,870 | 4/1984 | Hazel et al. | 369/44 |

Primary Examiner—Donald McElheny, Jr.
Attorney, Agent, or Firm—Antonelli, Terry & Wands

[57] ABSTRACT

An optical information recording system in which predetermined information is recorded by a first laser light beam on a recording medium along a guiding groove previously formed in the recording medium. Second and third laser light beams are projected onto the recording medium at positions deviated from the center of the guiding groove and preceding and succeeding to the first laser beam. A pattern in which no mutual interference of information to be recorded by the first laser beam is present is detected from an information signal which modulates the intensity of the first laser light beam. A difference is determined between the quantity of light reflected upon illumination of the recorded pattern by the second laser beam chronographically succeeding to the first laser beam and the quantity of light reflected upon illumination by the third laser beam. The position of the first laser beam is controlled on the basis of the thus determined difference for effecting an information tracking operation with improved accuracy.

8 Claims, 37 Drawing Figures

SYSTEM FOR OPTICALLY RECORDING INFORMATION

CROSS REFERENCE TO RELATED APPLICATIONS

The present invention relates to the subject matter disclosed in copending applications; U.S. Ser. No. 408,678 filed on Aug. 16, 1982 and assigned to Hitachi Ltd., EPC application No. 82107867.2 filed on Aug. 26, 1982 by Hitachi Ltd., Japanese patent application No. 56-134070 filed on Aug. 28, 1981 by Hitachi Ltd., invented by Ueda, Nakamura, Tsunoda and Kaku.

BACKGROUND OF THE INVENTION

The present invention relates generally to an optical information processor for optically recording and/or reproducing information, and more particularly concerns an information tracking apparatus for tracing information by light beams or spots with high accuracy.

For reading out information from a disc surface in which information is previously recorded in a spiral track pattern as is in the case of an optical video disc, an optical audio disc and the like systems, a tracking function or control is required for causing a writing/reading light spot to trace the information track with accuracy. The tracking control in turn requires an operation for detecting positional deviation of the light spot from the information track and a control operation for displacing the light spot in dependence on a magnitude of the detected deviation and the direction thereof to correctively cancel the deviation.

Figure 1A:
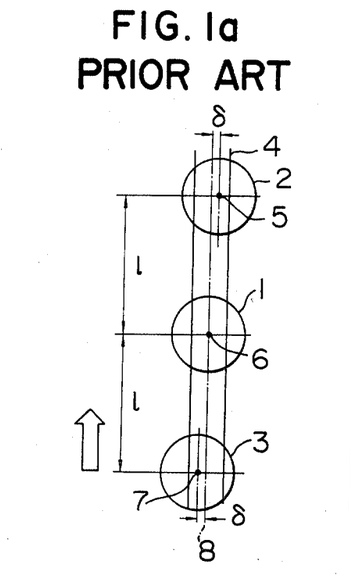
FIGS. 1a and 1b are schematic views for illustrating the principle of a tracking error detection by using two auxiliary light spots.
Figure 1B:
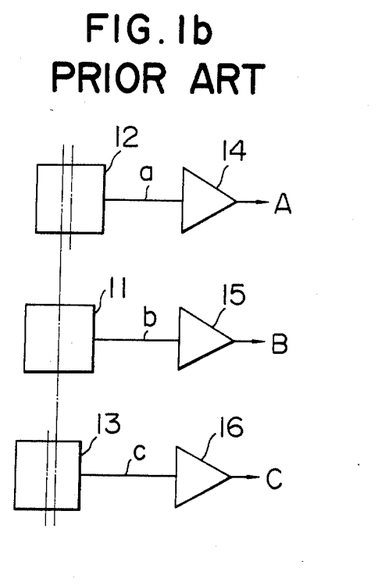

In the optical video disc systems which are currently commercially available, a tracking control system is practically adopted in which deviation of the light spot from the information track or groove (hereinafter also referred to as the tracking error) is detected by making use of two auxiliary light spots in addition to the main light spot which serves as writing/reading spot. For example, reference is to be made to Japanese Laid-Open patent application No. 44-50954. The principle of this known tracking control system will briefly be reviewed below. Referring to FIG. 1a of the accompanying drawings, an information reading light spot 1 is positioned at a mid point between two auxiliary light spots 2 and 3 with an equal distance l thereto. It will further be noted that the centers 5 and 7 of the auxiliary light spots 2 and 3 are deviated to the right and to the left (as viewed in the drawing), respectively, by a same distance δ from a virtual center line 8 which passes through the center 6 of the readout light spot 1 and extends in parallel with the direction in which the information track is moved forwardly as indicated by a blank arrow. Thus, the light spots 2 and 3 may be considered to sandwich the light spot 1 in directions which are both parallel and perpendicular to the information track or groove. Photodetectors for receiving light rays reflected from the disc illuminated by the light spots are disposed on an image plane of an objective lens or lenses for focusing the reflected light rays. More specifically, referring to FIG. 1b, images of the light spots 2, 1 and 3 are focused onto the photodetectors 12, 11 and 13, respectively, through associated objective lenses (not shown). The output signals of the photodetectors 12, 11 and 13 are amplified by associated amplifiers 14, 15 and 16 to constitute output signals A, B and C, respectively. In the case of an optical video disc, the information track denoted by a numeral 4 is constituted by a series of pits (i.e. elongated or circular holes each having a depth corresponding to a quater wavelength of a light source) pressed into the disc surface in a phased array and representing information. Since the information signal recorded on the video disc is derived through frequency modulation of the video signal (whose band covers a range from DC to 4 MHz), it is possible to detect variations or changes in the DC component to be utilized for the tracking control without being subjected to influence of the information signal by selecting the band of the amplifiers 14 and 16 to be sufficiently narrow as compared with that of the information signal.

Figure 2:
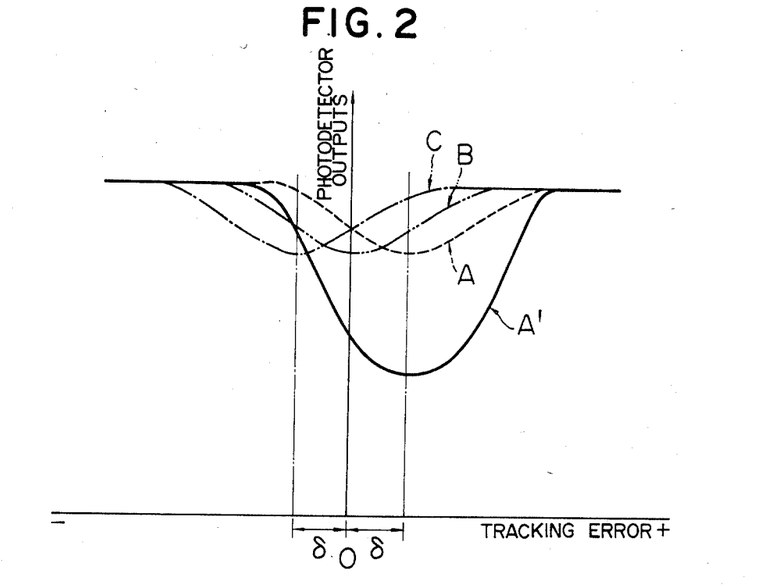
FIGS. 2 and 3 are graphs for illustrating characteristic behaviors of tracking error detecting signals.

Assuming now that behavior or variation of the DC component of the output signal B occurring upon traversal of the reading light spot 1 across a track is represented as a function of deviation from the center of the track (i.e. tracking error), the behavior will be such as indicated by a double-dotted broken line curve B in FIG. 2. The output signals A and C correspond to the output signal B shifted to the right (i.e. in the positive direction) and to the left (i.e. in the negative direction), respectively, by the distance δ along the abscissa symmetrically to the ordinate, since the auxiliary light spots 2 and 3 corresponding to the output signals A and C are deviated symmetrically from the reading light spot 1, as described above. This means that the rightward deviation or displacement of the track 4 as viewed in FIG. 1a causes the quantity of reflected light of the auxiliary spot 2 to be decreased while the quantity of reflected light of the spot 3 is increased, and vice versa.

Figure 3:
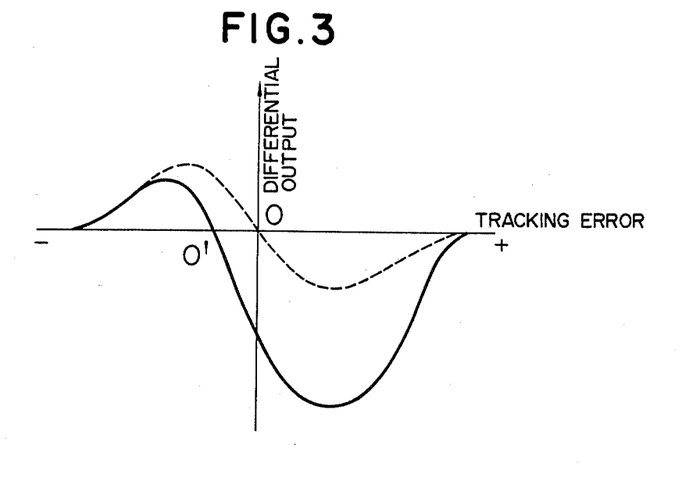

For detecting the tracking error, the output signals A and C may be supplied to the inputs of a differential amplifier whose output signal will then be such as indicated by a broken line curve in FIG. 3. The tracking control is made with the aid of light spot control means such as a light beam deflector or the like in such a manner that the output signal of the differential amplifier becomes zero, i.e. the quantities of reflected light of the auxiliary spots 2 and 3 are equal to each other. As will now be appreciated, the tracking control system mentioned above can certainly assure the tracing of the information track by the reading light spot in a stabilized manner, so far as information is previously recorded as in the case of the optical video disc or the optical audio disc. However, in the case of an information processor commonly referred to as the digital optical disc system which is destined to record and reproduce digital information, video information and others on a real-time base, the hitherto known tracking control apparatus suffers a shortcoming that the accurate tracking (i.e. track tracing operation) can not be attained in the recording mode operation. This problem will be scrutinized below.

Figure 4:
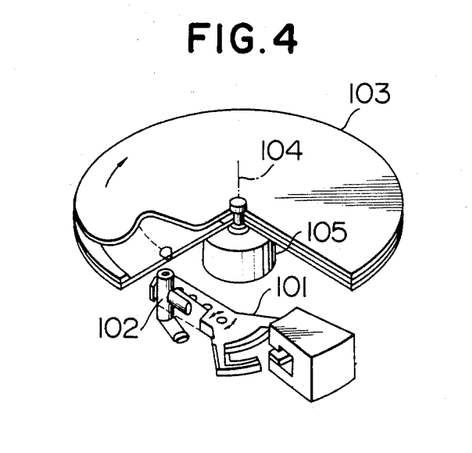
FIG. 4 is a view showing a general structure of an information processing apparatus for an optical disc.

In a typical one of the known digital optical disc systems, recording of information on a disc composed of a photosensitive information recording medium (e.g. a metallic film) formed on a disc substrate through vapor deposition is accomplished in such a manner that light from a high-power laser is focused in the form of a light spot having a diameter of the order of 1 μm on the surface of the spinning disc with the intensity of the laser beam being modulated in accordance with information to be recorded, as the result of which information is recorded on the recording medium in the form of holes referred to as pits thermally produced in the disc surface in a spiral or concentric circular pattern. In the playback operation, the information carrying medium of the disc is irradiated with a focused light beam of a low-power laser to pick up the recorded information in terms of variations in the quantity of light reflected from the pits. For particulars, reference may be made to an article titled "Ten Billion Bits Fit Onto Two Sides of 12-inch Disc", *Electronics*, No. 23 (1978), p. 75. This information processor system is typically inplemented in such a structure as shown in FIG. 4. Referring to this figure, a disc 103 having a diameter on the order of 30 cm is rotated in the direction indicated by an arrow around a rotating shaft 104 driven by an electric motor 105. An optical head 102 which is constituted by a laser light source, an optical system for guiding laser light from the light source to the disc 103 and photodetectors for detecting light reflected from the disc is mounted on a swing arm actuator 101 to be movable in a radial direction of the disc 103. Recording and playback operations of the optical information processor of the above mentioned structure will be described below by referring to FIG. 5 which shows in a fragmental enlarged view a structure of a disc used to this end.

Figure 5:
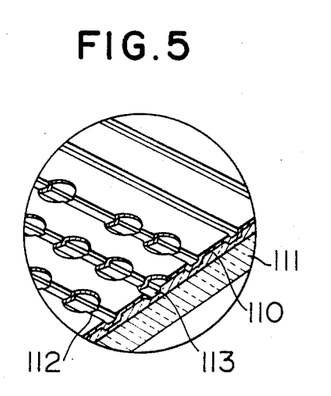
FIG. 5 is an enlarged fragmental view showing a structure of an optical disc.

A groove 113 of a concaved form in section referred to as the guide groove having predetermined width and depth is formed in a spiral or concentric circular pattern in a ultraviolet-hardenable resin layer deposited on a disc substrate 111 of a glass or plastic material. A metallic film 110 is formed over the groove forming resin layer through vapor evaporation. Laser light emitted from the optical head 102 is focused in the form of a spot and moved along the guide groove 113 to thereby record information in the form of pits 112 in the manner described above. In the playback mode, the information carrying disc surface is illuminated with the light spot along the guide groove 113 to detect the quantity of reflected light. Additionally, signals for controlling the main light spot are also derived on the basis of the quantity of reflected light.

The light spot control signals include primarily an off-focus detection signal representative of the out-of-focus state of the light beam due to vertical vibrations of the disc and a tracking error detection signal representative of deviation or error between the center of the light spot and that of the guide groove. These two signals are derived from light rays reflected from the metal film at locations other than the information pits.

Returning to FIG. 1a, the auxiliary spots 2 and 3 as well as the information writing/reading or main spot 1 are formed by splitting a light beam emitted from a single laser light source into the corresponding number of beams by means of a diffraction grating. The ratio of light intensity distribution of the auxiliary spot to that of the main or information writing/reading spot is set at about 1/10 with a view to increasing the light utilization for the main or information writing/reading spot. In the recording mode, the laser power is increased for forming the pits. At this time, the tracking operation for causing the main or writing spot 1 to follow the guide groove 113 has to be carried out simultaneously with the recording operation. However, in the case of the recording mode, the tracking error can not be detected with accuracy by the hitherto known method, giving rise to a problem.

More specifically, it is assumed that the direction indicated by the arrow in FIG. 1a is tangential to the rotating direction of the disc. As the pits are formed by the main or writing light spot 1 having intensity modulated in accordance with information to be recorded in the recording operation, the reproduced signal originating in the auxiliary spot 2 is subjected to the influence of the formed information pit and is decreased in magnitude. As the consequence, the output signal of the photodetector 12 amplified by the amplifier 14 varies in such a manner as represented by a solid line curve A' in FIG. 2. Under the circumstances, the output signal of the differential amplifier which represents the difference between the outputs of the amplifiers 14 and 16 (this difference corresponds to the tracking error signal) is modified as indicated by a solid line curve in FIG. 3 which is remarkably deviated from the broken line curve representative of the desirable tracking error signal. Under the circumstances, the intrinsic center position 0 of the track is shifted to a position indicated by 0' as shown in FIG. 3, involving a corresponding offset in the tracking error signal. Accordingly, when the tracking servo control is performed on the basis of this detected signal (solid line curve), the center of the main or writing light spot is positioned at the offset point 0', as the result of which the information pits are recorded at incorrect positions, to a serious drawback.

SUMMARY OF THE INVENTION

It is therefore an object of the present invention to provide an optical information processing apparatus in which the offset of the tracking error described above is electrically cancelled out and which allows information tracking to be performed stably with high precision without undergoing influence of the information record pits.

In view of the above object, it is proposed according to a general feature of the present invention that an array pattern of information pits recorded by means of the main spot is detected and that a signal level of such a portion of the signal reproduced through illumination by an auxiliary light spot chronographically succeeding to the main spot that is not subjected to the influence of the information pit is detected on the basis of the pit array pattern detecting signal, wherein tracking control for positioning correctly the main spot is effected in dependence on the difference between the reproduced signal levels derived from the preceding and succeeding auxiliary spots.

BRIEF DESCRIPTION OF THE DRAWINGS

The above and other objects, features and advantages of the present invention will become more apparent from the following description of preferred embodiments of the invention taken in conjunction with the drawings, in which:

FIG. 6a and b are time charts for illustrating a chronographical relationship between a main light spot and a succeeding auxiliary light spot;

FIGS. 14 to 18 are views for illustrating a second embodiment of the invention, wherein

DESCRIPTION OF THE PREFERRED EMBODIMENTS

In the following, the present invention will be described in detail in conjunction with the preferred embodiments.

Among the information processing systems for the optical discs, there is known a system in which the number of revolution of the disc is maintained at a constant value independent of the tracking position in the radial direction of the disc. An exemplary embodiment of the invention described below is assumed to be applied to this type of the information processing system.

Figure 6:
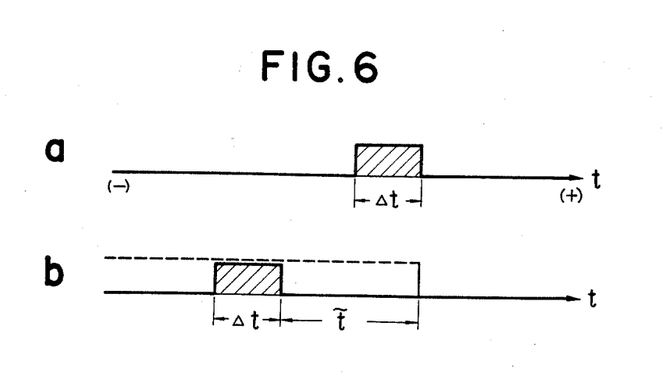

Let's assume now that the disc is rotated in the direction indicated by the blank arrow in FIG. 1a. When consideration is made on a group of given pits formed on the disc surface and representing recorded information in terms of geometrical quantity of inter-pit interval (i.e. distance between given adjacent pits), the information pit group is detected by the photodetectors 12 and 11 on the time base in such a manner as shown in FIG. 6. In the figure, each of the hatched blocks represents the signal reproduced from the pit group. A travelling speed v of a given point on the disc surface is given by the following expression:

$$v = \omega r \quad (1)$$

where $\omega$ represents the angular velocity (revolution number) of the disc and r represents the radial distance between the given point and the center of the disc. When the length of the given pit group is represented by $\Delta l$, the corresponding length $\Delta t$ on the time base is given by $$\Delta t = \Delta l / \omega \times 1/r \quad (2)$$

The time-based length $\Delta t$ is thus of a constant value so far as the radial distance r is constant.

On the other hand, in the chronographical relationship between the signals a and b reproduced through the photodetectors 11 and 12, respectively, it will be seen that the signal b (reproduced through the photodetector 11) leads the signal a by a time t, which in turn means that the auxiliary light spot 2 succeeds or follows the main light spot 1 in respect of the time. On the other hand, when the rotating direction of the disc is reversed, i.e. the direction indicated by the arrow in FIG. 1a is reversed, the auxiliary light spot 2 of course precedes to the main spot 1. Here, relation expressed by $v \times t = 1$ applies valid, where 1 represents the distance between the main and the auxiliary spots. Hence, $$t = 1/v = 1/\omega \times 1/r \quad (3)$$

In other words, t is a function of the radial distance r.

As described hereinbefore, the main beam 1 as well as the auxiliary beam spots 2 and 3 are usually derived by splitting a single light beam from a laser light source by means of a phase diffraction grating, wherein the intensity of the auxiliary spots is set at ca. 1/10 of that of the main spot beam. In the recording operation, a high-power of the light source laser is utilized for opening the information holes or pits into the metallic film deposited on the disc substrate. In this connection, it is important to note that the pits should not be formed by the auxiliary spots but only by the main spot. To this end, the intensity of the auxiliary spots is set at a ratio as mentioned above. Of course, the present invention is not restricted to the beam splitting type for producing the main and auxiliary spots by using the diffraction grating. For example, a semiconductor laser array having a number of light emitting points may be employed for producing individually the main spot beam and the auxiliary spot beams.

When the disc is determined to be rotated in the direction indicated by the blank arrow in FIG. 1a, the auxiliary spot 2 which succeeds to the main spot in respect of the time travels on the pit (i.e. area with information recorded) formed by the preceding main spot and undergoes influence exerted by the information pit. On the other hand, the other auxiliary spot 3 that leads or precedes to the main spot 1 in the time is focused at the area where no information pit is formed yet (i.e. the area with no information recorded) and thus subjected to no influence of the information pit at all.

Figure 7:
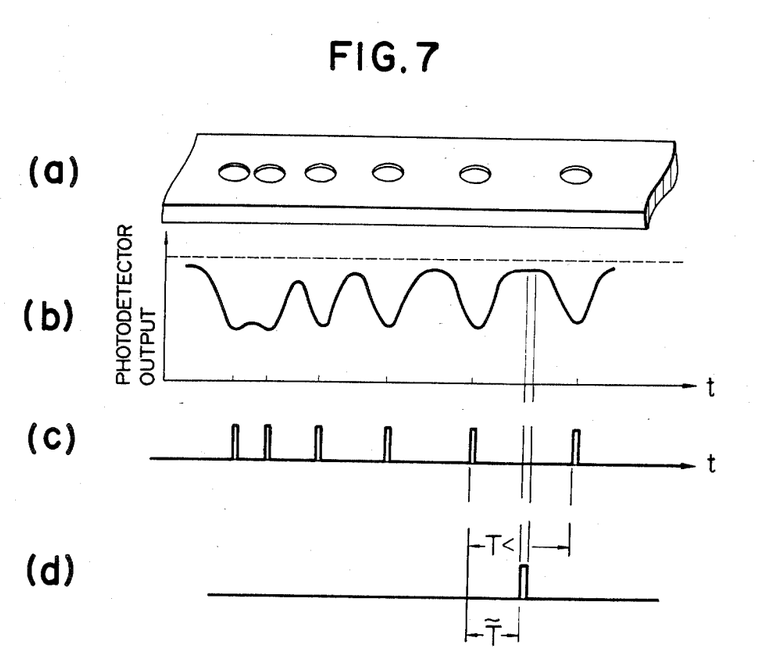
FIG. 7, including (a)–(d) are time charts for illustrating relation between a pit array and a reproduced signal waveform.

Influence of the information pit formed by the main beam 1 to the auxiliary beam 2 will be described by referring to FIG. 7. When a series of pits each having a predetermined diameter are recorded at a varying inter-pit intervals as shown in FIG. 7 at (a), the output signal of the photodetector receiving light reflected by these pits is of such a waveform as shown at (b) in FIG. 7. Of course, the inter-pit interval as well as pit frequency differs in dependence on the type of modulation actually employed. The output signal of the waveform (b) is converted into digital or pulse signal shown in FIG. 7 at (c) through peak detection for the reproduction of information. As will be understood from the illustrations (a) and (b) of FIG. 7, when the inter-pit distance or interval exceeds a predetermined geometrical length which is typically about twice as large as the diameter of the main light spot or, alternatively saying, when the chronographical inter-pit interval exceeds a predetermined time T on the condition that the optical disc is driven at a predetermined fixed revolution number, mutual interference of the adjacent pits is significantly reduced, resulting in that the auxiliary spot is protected from the influence of the information or record pits.

Accordingly, in the case of the embodiment of the invention now being described, the level of reflected light of the succeeding auxiliary light spot 2 at the location where no mutual interference of the pits formed by the preceding main spot takes place is detected for deriving the tracking signal. More specifically, the pit formed at an interval which is greater in terms of the time than the period T is detected from the information pit array, wherein the level of reflected light of the auxiliary spot 2 is detected at a time point delayed relative to the detected pit by a time T and compared with the reflected intensity level of the auxiliary spot 3 to determine a difference which is a measure of the tracking error.

It is easy to detect the pit pattern in which the chronographical inter-pit interval is greater than the time T. For example, such pit pattern can be detected from a logical pattern of the information signal modulated in accordance with data to be recorded. More particularly, data to be recorded are once placed in a memory at a given clock frequency, and intervals between the individual data elements are measured in the state where the data are read from the memory. When the data elements the time interval between which is greater than T are detected, a pulse for sampling the output signal of the photodetector 12 associated with the auxiliary spot 2 is produced at the time point which is delayed by T relative to the time point at which the relevant data elements are read out from the memory, as is illustrated in FIG. 7 at (d). The time T may be set slightly shorter than the time T. For example, when the time interval T is set at a value which is about twice as great as the diameter of the light spot in terms of geometrical dimension, the time delay T may be so set as to correspond to 1.5 times the diameter of the light spot. At any rate, such chronographical conditions can be appropriately determined in accordance with the type of modulation as employed. Further, a time delay between the information signal to be recorded and the signal reproduced in response to the illumination by the auxiliary spot 2 varies in dependence on the radial position on the optical disc. This time delay can be detected through a pattern collation which will be described below in conjunction with FIG. 8.

Figure 8:
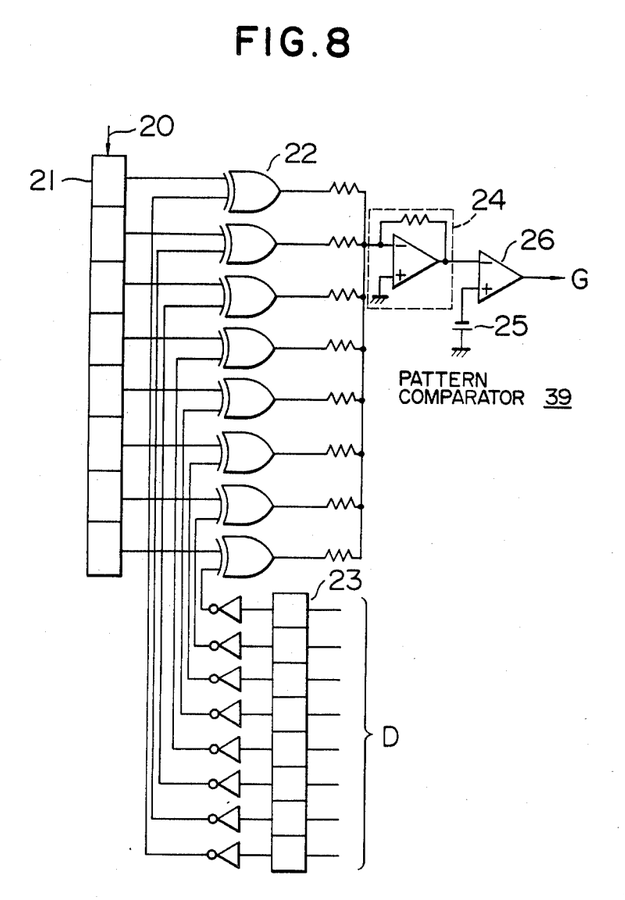
FIG. 8 shows a schematic circuit diagram of a pattern coincidence detecting circuit.

Referring to this figure, the signal produced in response to illumination of the auxiliary spot 2 is digitalized into sequential discrete signals or pulses 20 and supplied to the input of a shift register 21 which is assumed to include eight shift stages in the illustrated embodiment, although the number of the shift stages varies in dependence on the type of modulation adopted actually. Further, a pattern D extracted from information or data signals at a given preceding time point are applied to the input terminals of latches 23, whose output signals are once inverted by respective inverters and applied to first inputs of associated Exclusive-OR circuits 22, respectively, while the output signals appearing at the outputs of the individual stages of the shift register 21 are applied to the second input terminals of the Exclusive-OR circuits 22, respectively. The output signals from the Exclusive-OR circuits 22 are supplied through respective resistors to an adder circuit 24 to be added together. The output signal of the adder circuit 24 in turn is compared with a preset level 25 through a comparator 26. When the pattern of the signals reproduced through illumination with the auxiliary light spot 2 coincides with the pattern D extracted from the information or data signal at the given time point, the output signals of the Exclusive-OR circuits 22 become logic "1s", resulting in that the output signal of the adder circuit 24 exceeds the preset level 25, whereby the output signal G of the comparator 26 becomes logic "1". By measuring a time elapsed from the given time point at which the recording signal pattern D was extracted or determined to the time point at which the output signal G becomes logic "1", it is possible to determine the time t independent of the radial distance r.

Figure 9:
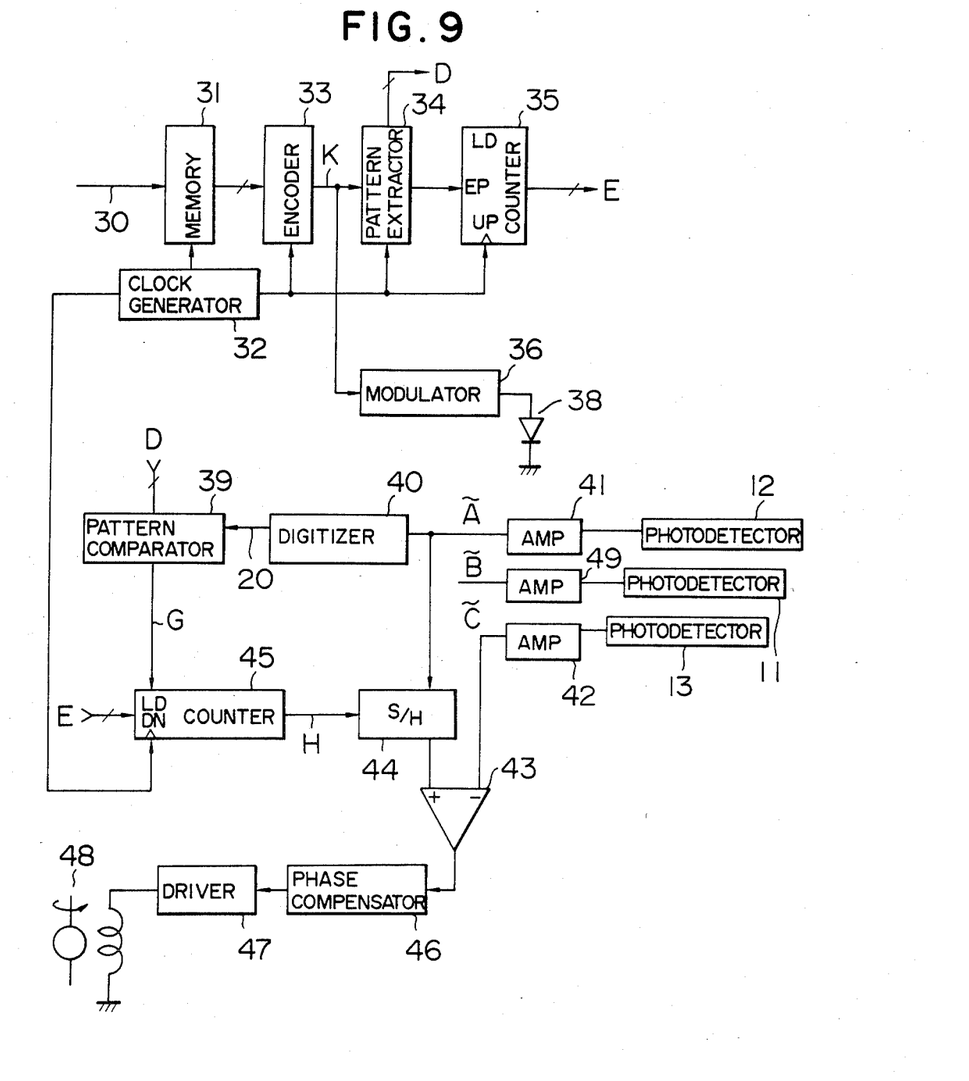
FIG. 9 is a block diagram showing a general arrangement of an optical information processing apparatus according to a first embodiment of the present invention.

FIG. 9 shows in a block diagram a general arrangement of the optical information processor according to a first embodiment of the present invention. In this figure, the disc and the optical system for guiding light from the light source to the disc are not shown since they may be same as those described hereinbefore in conjunction with FIGS. 4 and 5. For particulars of the optical system, reference may be made to the Japanese Laid-Open patent application No. 49-50954 cited before.

Referring to FIG. 9, information or data signals 30 to be recorded are stored in a memory 31 under the timing of a clock signal produced by a clock generator 32. The output signals from the memory 31 are supplied to an encoder or modulator 33 to be encoded into record signals K ready for being recorded, which are then inputted to a modulator or driver 36 destined for driving a light source 38 which may be constituted, for example, by a semiconductor laser or the like, to thereby correspondingly modulate the intensity of light emitted by the light source 38. Further, the record signal K to be recorded are supplied to a pattern extracting circuit 34 for producing the aforementioned signal pattern D. The timing or clock signal in response to which the signal pattern D is produced is applied to a load input terminal of a counter 35. Additionally, a signal for holding an input gate for the counter 35 in the enabled state until a signal makes appearance at a time interval greater than T among the time-serial signals K to be recorded is prepared on the basis of the timing signal mentioned just above. The output signal E of the counter 35 can be utilized for determining the time point at which the level of reflected light of the auxiliary spot 2 is sampled in succession to the aforementioned pattern collation or comparison.

Figure 10:
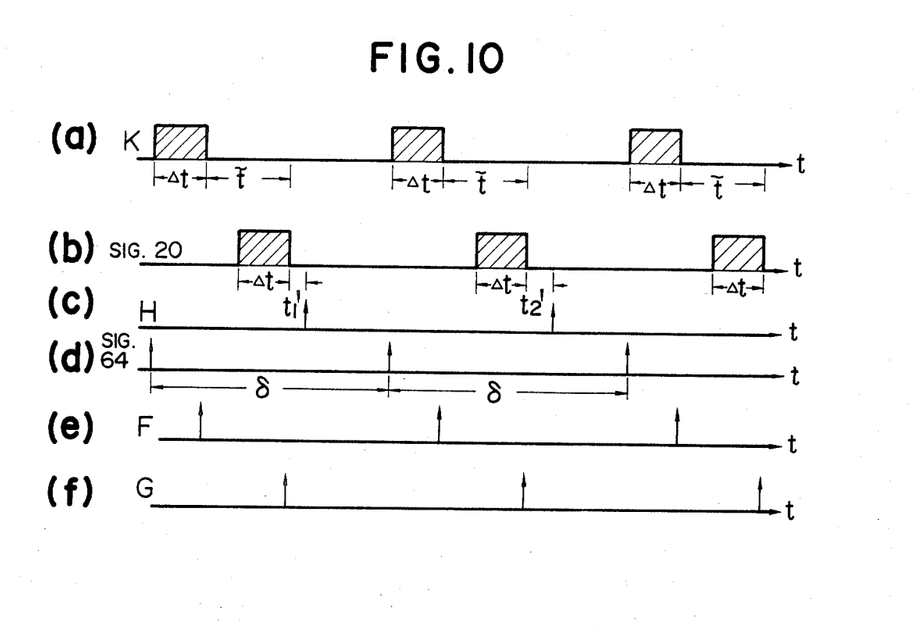
FIGS. 10, consisting of (a)–(f), 12(a)–f, and 13(a)–c show time charts for graphically illustrating operations of the apparatus shown in FIG. 9.
Figure 11:
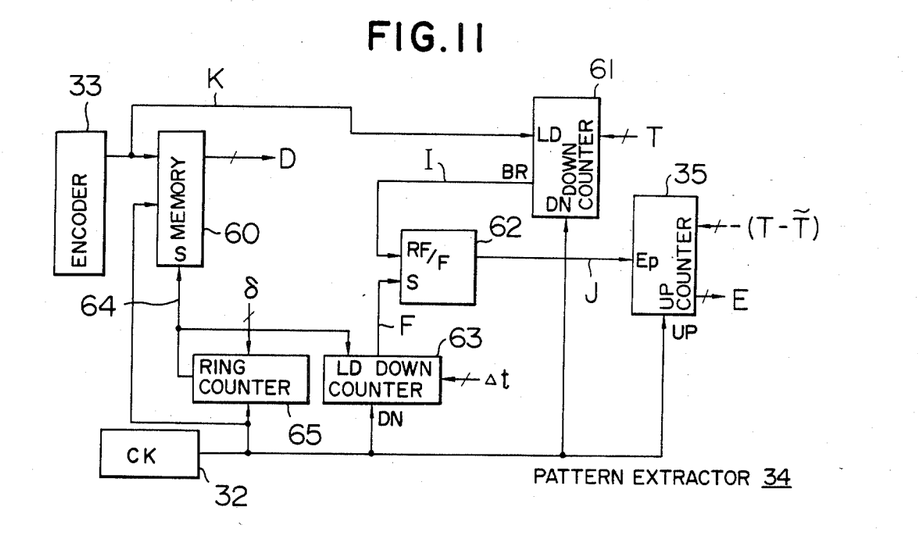
FIG. 11 is a block diagram showing a pattern sampling (extracting) circuit used in the system shown in FIG. 9.
Figure 12:
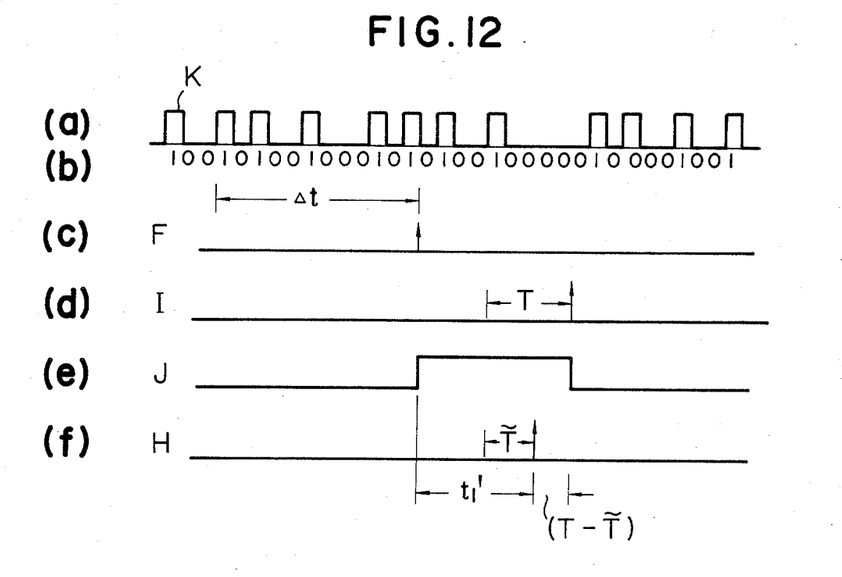

This operation will be elucidated in more detail by also referring to FIG. 10 showing a time chart in combination with FIG. 11 which shows in a block diagram a circuit configuration of the pattern extracting circuit 34 and FIG. 12 which shows a signal timing diagram. The light beam emitted by the light source 38 and modulated in intensity in accordance with the signals K to be recorded is projected through the optical system onto the rotating disc, whereby the pits are formed by the main light spot 1 in accordance with the signals K on the time series base in the metallic film deposited on the disc. Referring again to FIG. 1a, the pit formed by the main light spot 1 traverses the auxiliary spot 2 with the time delay t, since it is assumed that the disc is rotating in the direction indicated by the arrow while the main and auxiliary light spots are fixed in position. Chronographical relation between the record signals K to be recorded and pulse signals 20 derived through peak sampling of the signal A reproduced in response to the illumination of the corresponding pits by the auxiliary light spot 2 is illustrated in FIG. 10 at (a) and (b), in which each of the hatched blocks represents the pattern D described hereinbefore. A time-based structure of this pattern D is shown in FIG. 12 at (a), by way of example. The pattern D is composed of a combination of logic "0s" and "1s" and can thus be referred to as the logical pattern having a period Δt. Referring to FIG. 11, a numeral 64 denotes the timing signal for extracting the logical data signals falling within the period Δt from the time-serial flow of the signals K. For producing the timing signal 64, the clock signal produced by the clock generator 32 is applied to the input of a ring counter 65, as is shown in FIG. 11, to thereby produce pulses each having a period δ shown in FIG. 10 at (d). The ring counter 65 may be constituted by a conventional down-counter in which a number of clock pulses equivalent to the period δ are first placed through a data input terminal and successively counted down in response to the clock signal supplied from the clock generator 32 until the content of the down-counter becomes zero to produce a borrow signal representative of the zero content of the down-counter. This borrow signal is then made use of as the load signal for placing again the number of clocks equivalent to the period δ in the down counter through the data input terminal. In this way, the data loaded in the down-counter is in the strictive sense the number of clocks which is equivalent to the period δ. However, in the description which follows, the data loaded in the counter will be simply called the period δ.

The period δ should preferably be as short as possible for detecting the tracking error signal with high accuracy. However, this period δ has to be longer than the sum of the duration Δt of the pattern D and the time t taken for a pit to move from the main light spot to the auxiliary light spot. Further, since the tracking signal is sampled at this period, the repetitive frequency has to be sufficiently high as compared with the cut-off frequency of a tracking servo system. The duration of period δ should be selected so as to meet these requirements.

Referring to FIG. 11, the pattern D is obtained by inputting the record signals K to be recorded to the memory 60 which may be constituted by a shift register, by way of example, wherein the signal 64 is made use of as the timing signal for memory activation (i.e. for placing the pattern data in the memory) under the control of the clock signal generated by the clock oscillator or generator 32. The signal produced by the clock generator 32 will hereinafter be referred to simply as clock. A signal F which indicates that the pattern D has been placed in the memory 60 can be obtained by inputting the clock to the down counter 63 while applying the signal Δt to the data input terminal thereof, with the signal 64 being utilized as the timing signal for the loading of the counter 63. The signal F is then produced at the borrow output terminal of the counter 63 at a time point delayed by Δt relative to the application of the timing signal 64. The chronographical relation in concern is illustrated in FIGS. 10 and 12.

Next, description will be made of a method of finding out the inter-pulse interval which is longer than the predetermined time interval T from the signal K to be recorded, by referring to the time chart shown in FIG. 12 and the circuit block diagram shown in FIG. 11.

The record signal K is a time-serial signal as shown in FIG. 12 at (a) whose logical pattern is shown at (b) of the same figure. Referring to FIG. 11, the signal K to be recorded is supplied to a loading input terminal of a down counter 61 while the time interval data T is supplied to the counter 61 through the data input terminal thereof. Through the count-down operation of the counter 61 in response to the clock applied to the count-down input terminal thereof, a borrow signal I is produced at the relevant output terminal of the counter 61 when the inter-pulse interval of the signal K becomes longer than the predetermined interval T, with a time delay corresponding to T relative to the pulse which precedes to that inter-pulse interval. In this way, in dependence on whether the borrow signal I is produced or not, the inter-pulse interval which exceeds the predetermined time T can be found out.

Next, description is made about a manner of preparing a timing signal $t_1'$ for sampling the tracking error signal in succession to the detection of the coincidence of the pattern D. As will be seen from FIG. 10, the period of the timing signal $t_1'$ will become different in dependence on the time-serial logical pattern of the signal K to be recorded. For example, the sampling period being now considered and represented by $t_1'$ may vary to a different period $t_2'$ at the succeeding sampling time. In any case, the timing for sampling the tracking error signal may preferably be determined in such a manner that two successive pulses whose inter-pulse interval is greater than the predetermined time duration T are detected, wherein the timing for sampling is set at a time point which is delayed by the time T relative to the preceding one of the two detected successive pulses on the time base. Since the sum of the time T and the time spanning the signal F and the above mentioned preceding pulse is equal to $t_1'$, the latter can be determined through a procedure mentioned below. Referring to FIG. 11, a flip-flop 62 is set by the signal F while it is reset by the output signal I of the down-counter 61. The output signal J of the flip-flop 62 is such as shown in FIG. 12 at (e). Since the values of T and T given in terms of the numbers of clocks as described hereinbefore are known, the time $t_1'$ is determined by subtracting (T−T) from the time duration in which the signal J remains at logic "1" level. This time $t_1'$ is converted into a corresponding number of the clocks to obtain data E. To this end, the signal J may be applied to a gate input terminal of an up-counter 35 (which serves to gate straightforwardly the input clocks), while a complement of (T−T) converted into the corresponding number of the clocks is applied to a data input terminal of the counter 35, with the clocks being applied to the up-count input terminal thereof.

On the conditions, the content of the up-counter 35 is counted up in response to the clock input so long as the signal J is at logic "1" level, resulting in that there makes appearance at the data output terminal thereof the instantaneous content of the up-counter 35 from which the difference (T−T) has already been subtracted. Thus, the data output signal of the up-counter 35 is nothing but the data signal E mentioned above and representing the time $t_1'$ (in terms of the clock number) for sampling the tracking error signal in succession to detection of the pattern (D) coincidence.

Referring again to FIG. 9, the output signal from the photodetector 12 is amplified by an amplifier 41 having a wide band covering up to the band of data signal, whereby a signal A is obtained as the output of the amplifier 41. The signal A is inputted to a digitizing circuit 40 to be converted into a digital or pulse signal 20 which is then supplied to the one input of the pattern collation or comparison circuit 39 described hereinbefore in conjunction with FIG. 8. The circuit 39 has the other input to which the pattern D of the signal K to be recorded is applied at a certain time point, whereby the coincidence signal G is produced upon coincidence between the pulse signal 20 and the pattern D. The coincidence signal G is inputted to a load terminal of a counter 45 to allow the output data E from the counter 35 to be placed in the counter 45. The content or data E is counted down in response to the clock input, resulting in that a borrow signal H is produced when the content of the counter 45 becomes zero. The borrow signal H is inputted to a sample and hold circuit 44 for causing the reproduced signal A to be sampled and held. The output signal of the sample and hold circuit 44 is applied to one input (non-inverting input) of a differential amplifier 43 having the other input (inverting) supplied with the reproduced signal C derived from the photodetector 13 and amplified through a wide band amplifier 42. The difference signal output from the differential amplifier 43 constitutes the tracking error signal. In this connection, it should be mentioned that the sample and hold circuit may be interposed between the wide band amplifier 42 and the differential amplifier 43, wherein the sample and hold circuit is controlled by the aforementioned signal H to thereby sample and hold the reproduced signal B originating in the auxiliary spot 3. The output signal of the differential amplifier 43 is inputted to the driver circuit 47 by way of a phase compensating circuit 46 to drive the light spot deflector 48 (such as galvanomirror, a two-dimensional actuator or the like) for controlling the position of the light spot in the tracking operation. The signal B produced by the photodetector 11 and amplified through the amplifier 49 is supplied to the input of a demodulator (not shown) to be utilized for reproduction of the information signal. As will be understood from the foregoing description, the tracking operation can be effected with improved accuracy without suffering any appreciable offset according to the teaching of the present invention. By the way, the frequency at which the signal A is sampled on the basis of the pattern D extracted from the signal K to be recorded should preferably be selected higher than the cut-off frequency of the tracking servo system by a factor of one magnitude.

Figure 13:
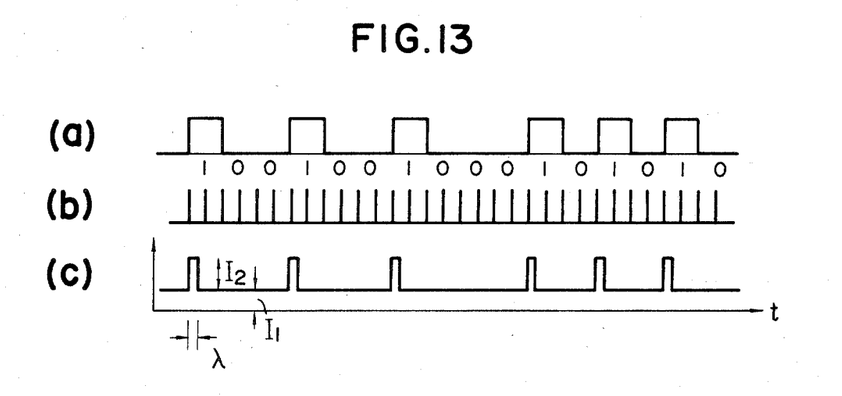

A slight delay is involved in the sampling timing in dependence on the waveform of the driving current of the driver (modulator) 36 for driving the light source, as described below by referring to FIG. 13.

In this figure, a logical pattern of the signal K to be recorded is shown at (a), while the clock signal produced by the clock generator 32 is illustrated at (b) on the assumption that the period of the clock signal is ½ of the data transfer period for the sake of simplification of the description. The waveform of the current produced by the driver 36 for driving the semiconductor laser 38 is shown at (c). The laser driving current contains a DC component $I_1$ and a series of superposed pulse current components $I_2$ for increasing intensity of laser light to form the pits in correspondence with the logic "1s" of the signal K to be recorded. In order that the form of the pit approximates true circle as close as possible, the pulse width $\lambda$ of the pulse current $I_2$ is usually selected narrower than that of the signal pulse K to be recorded. Since the sampling of the reproduced signal A is effected when the intensity of light is at the level corresponding to that of the ordinary reproduction mode, it is desirable that the sampling of the reproduced signal A be effected with the time delay $\lambda$ relative to the aforementioned timing so that the pulse current takes no part in the sampling. Needless to say, the rise-up edge of the pulse current is in synchronism with the clock.

A second exemplary embodiment of the invention will be described in the following. As is in the case of the first embodiment, it is assumed that the number of revolution of the disc is constant independent of radial positions on the disc. In this connection, there is known from U.S. Pat. No. 4,364,118 an optical information processing system in which a series of pits are previously recorded at a constant period or inter-pit interval on the disc and pits to be additionally formed are impressed among these previously formed pits.

In the optical information processing system of this type, adoption of the tracking control with the aid of the auxiliary light spots is accompanied by the problem mentioned hereinbefore. This problem can be solved by detecting the quantity of light reflected by the previously formed pits (hereinafter referred to as the prepit) with no detection being made for the quantity of light reflected by the additionally formed pit. However, since the linear speed differs in dependence on the radial position on the disc because of the revolution number being constant, the time taken for a prepit to move in the relative sense from one to another auxiliary spot differs in dependence on the radial position because of the distance between the auxiliary spots being constant. As the consequence, it is difficult to sample the quantity of light reflected from the prepits at a predetermined constant time interval. The inter-prepit distance represented by L at a radial distance r from the center of a disc is given by $$L = v \times \tau = \omega \times \tau \times r \qquad (4)$$

where $\omega$ represents the angular frequency and $\tau$ represents the inter-prepit time interval (i.e. distance between the adjacent prepits given in terms of time).

Figure 14:
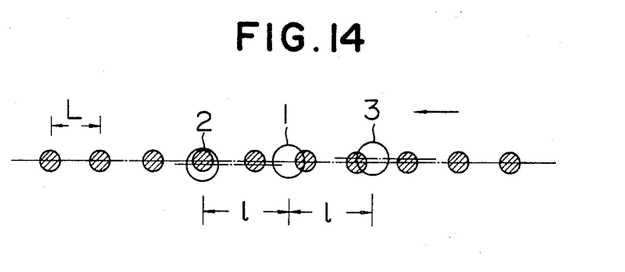
FIG. 14 is a view for illustrating the concept of prepits.

Since it is generally desirable that the prepits be impressed at a constant inter-prepit time interval $\tau$, the geometrical inter-prepit interval L is varied in dependence on the radial distance r from the center of the disc. In contrast, the geometrical distance between the main spot and the auxiliary spot is constant at l. Such being the circumstances, it is proposed that the time point at which the succeeding auxiliary light spot 2 traverses a given prepit is determined by detecting the time which is taken for the light spot to cover the geometrical inter-prepit interval or distance and which varies as a function of the radial distance r, on the basis of the signals detected in association with the preceding auxiliary light spot 3 and the main spot 1. In FIG. 14, there is shown a positional relationship among the prepits (represented by hatched circles) and the light spots 1, 2 and 3 (represented by hollow circles). As can be seen from FIG. 14, the geometrical inter-spot interval or distance l is given by $$l = n \times L + X \qquad (5)$$

where n is a given integer, and X represents a length in the range defined by $0 < X < L$.

Figure 15:
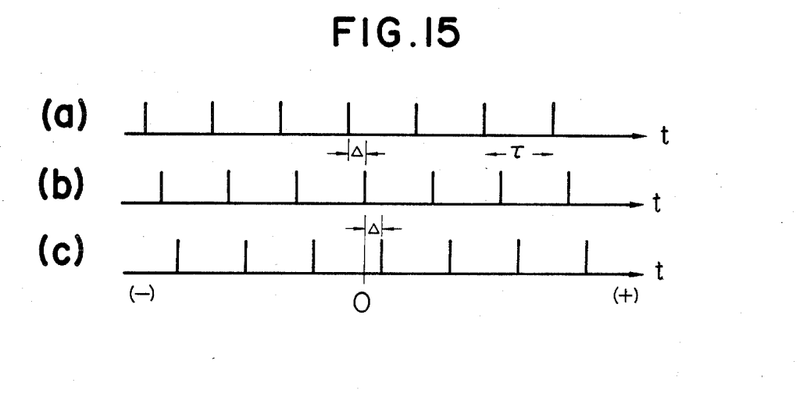
FIG. 15 including (a)–(c), is a time chart for illustrating relation among signals reproduced through illumination of the prepits by the main and the auxiliary light spots, respectively.
Figure 16:
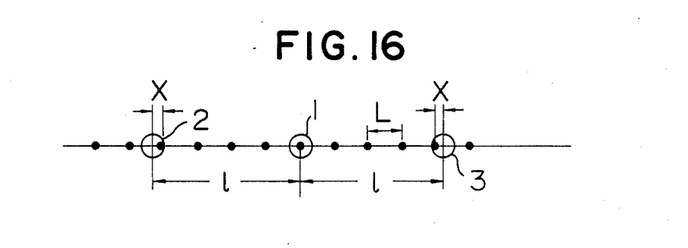
FIG. 16 is a view for illustrating geometrical relation between the individual light spots and the prepits.

FIG. 15 illustrates on the time base the prepit pulse signals (a), (b) and (c) read out from the prepits illuminated with the spots 2, 1 and 3, respectively, in the state corresponding to the positional relationship shown in FIG. 14 on the assumption that the disc is rotated at a constant angular velocity. In FIG. 15, $\Delta$ is related to X in accordance with the following expression:

$$X = \Delta \times \omega \times r \qquad (6)$$

As can be seen, the time $\Delta$ elapsing from the traversal of a given prepit by the preceding auxiliary spot 3 to the traversal of the given pit by the main spot 1 is equal to the time elapsing from the traversal of the given pit by the main spot 1 to the traversal by the succeeding spot 2. Thus, when the former time Δ is measured, the latter time can be determined by itself. It is thus possible to detect the tracking error signal suffering no influence of the information pits, by detecting through sampling the level of reflected light of the succeeding auxiliary spot on the basis of the measured time Δ.

Figure 17:
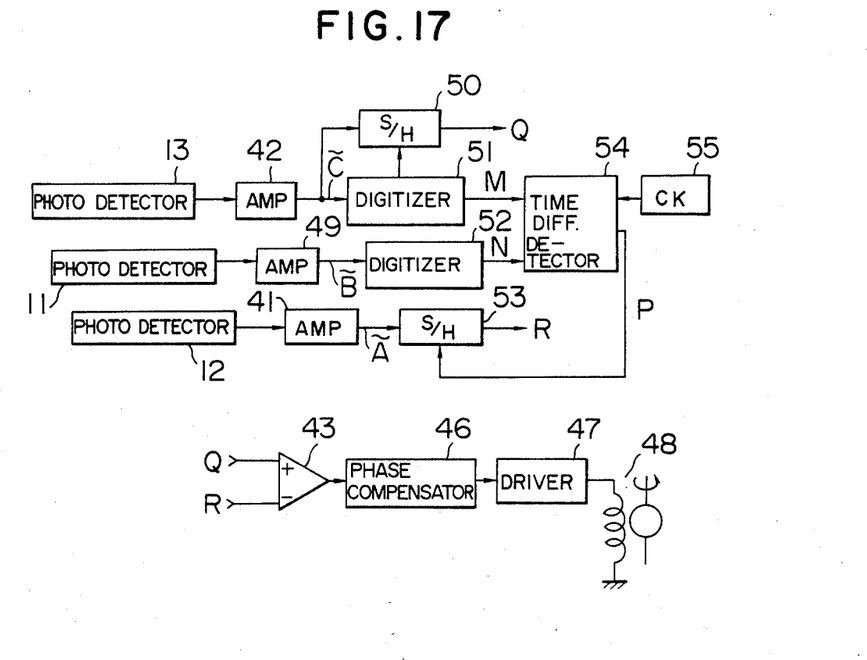
FIG. 17 is a block diagram showing a general arrangement of the optical information processing apparatus according to a second embodiment of the invention.
Figure 18:
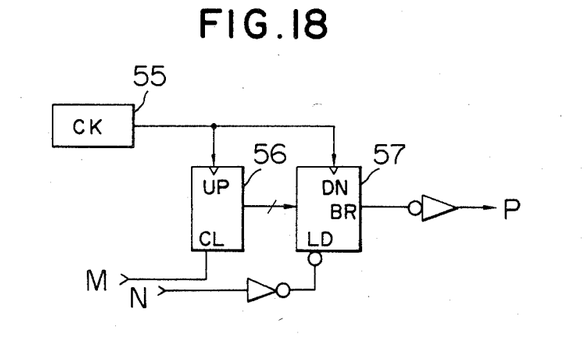
FIG. 18 shows a schematic diagram of a circuit employed in the apparatus shown in FIG. 17 for detecting timing error of the main and the auxiliary light spots relative to the prepits.

Now, description will be made on an arrangement of a main portion of the optical information processor according to the second embodiment of the invention by referring to FIG. 17. With respect to the additional pit impression by means of the main light spot, reference is to be made to U.S. Pat. No. 4,364,118 cited before. The manner in which the main spot 1 and the two auxiliary spots 2 and 3 are focused on the disc surface is same as in the case of the first embodiment shown in FIG. 9. The output signal of the photodetector 13 for detecting the reflected light level of the preceding spot 3 is supplied to a wide band amplifier 42 to constitute a signal C which is supplied to a digitizing circuit 51 to be utilized for the detection of the prepit. A prepit detection signal M produced by the digitizing circuit 51 is supplied as a sampling command signal to a sample and hold circuit 50 to cause the latter to sample and hold the signal C, whereby an output signal Q is produced by the sample and hold circuit 50. Further, the signal M is supplied to one input of a circuit 54 for detecting the time difference Δ between the auxiliary spot 3 and the main spot 1. The output signal from the photodetector 11 for detecting the reflected light level of the main spot 1 is supplied to a wide band amplifier 49 for producing an amplified output signal B which is then supplied to a digitizing circuit 52 for detection of the prepit. A prepit detection signal N produced by the circuit 52 is supplied to the other input of the circuit 54 for detecting the chronographical or time difference Δ between the main spot 1 and the auxiliary spot 3. Operation of the circuit 54 will be described below by referring to FIG. 18. A clock signal produced by a clock generator 55 is supplied to an up-counter 56 and a down-counter 57, respectively. The prepit detection signal M originating in the preceding light spot 3 is applied to a clear input terminal CL of the counter 56 to thereby reset the content of the counter 56 which subsequently operates to count up the clock pulses supplied from the clock generator 55. The output terminal of the counter 56 is connected to the data input terminal of the other counter 57 so that a number of clocks counted up by the counter 56 until the prepit detection signal N originating in the main spot 1 makes appearance are loaded in the down-counter 57. In this manner, the time difference Δ in the illumination of a given prepit between the preceding auxiliary spot 3 and the main beam spot 1 can be detected. The counter 57 has a count-down input terminal supplied with the clock. Thus, the data placed in the down-counter 57 is decremented in response to each of the input clocks to finally become zero, whereupon a borrow signal P is produced by the counter 57. The time duration in which the content of the counter 57 is counted down to zero represents the time difference Δ in the illumination of the given prepit by the main spot 1 and the succeeding auxiliary spot 2. Accordingly, the borrow signal P is utilized for causing a sample and hold circuit 53 to sample and hold the signal A supplied by the photodetector 12 through a wide band amplifier 41, to thereby derive a signal R. Difference between the signals Q and R is determined by the differential amplifier 43 for detecting the tracking error signal. The tracking operation is thus effected with improved accuracy by controlling the positions of the light spots on the basis of the tracking error signal in the same manner as is in the case of the embodiment shown in FIG. 9.

The optical information processor according to the present invention has been described above in conjunction with an optical disc device such as digital optical disc which permits additional recording. However, this embodiment of the invention shown in FIG. 17 can equally be applied to the reproduction—only optical disc system such as optical video disc, digital audio disc and the like to the advantageous effects which will be mentioned below. When the pit detection signal (output signal from the photodetector) originating in the auxiliary beam spot is gated through an amplifier incorporating a low-pass filter function as described hereinbefore, low-frequency component of the information signal are superposed on the output signal of that amplifier. Usually, the cut-off frequency of the low-pass filter is on the order of 10 KHz. Such low-frequency components may make appearance in the spectrum of the information signal in dependence on the type of modulation adopted actually. The low-frequency components are subjected to variation in level due to variation in the data pattern of the information signal and admixed into the tracking error signal as external disturbance noise. This problem can however be solved through the processing described above in conjunction with the circuit arrangement shown in FIG. 17 by taking a pattern having a predetermined periodicity present in the information signal (such as, for example, a synchronizing signal, a partition signal defining the boundary between the adjacent signal blocks or groups) for the prepit detection signal. To this end, the digitizing circuits 51 and 52 for detecting the prepits in the form of pulses may be replaced by circuits which are destined to detect a pattern exhibiting a predetermined periodicity included in the information signal.

In the foregoing description of the first and second embodiments of the invention, it has been assumed that the number of revolution of the disc is constant. However, there is known a system called CLV (Constant Linear Velocity) in which the rotation number is varied in dependence on the radial position on the disc so that the linear velocity is maintained constant. When the first embodiment of the invention is applied to this system, the time interval at which the succeeding auxiliary spot traverses the pits impressed by the main spot is constant and thus can be previously set, because the linear velocity as well as the inter-spot distance between the main spot and the auxiliary spots is constant. It is possible to detect through sampling the signal level reproduced by the auxiliary spot without being influenced by the information pit through detection of the information signal pattern having the inter-pit interval longer than the time T. In the case of the second embodiment in which the inter-prepit interval is constant independent of the radial distance on the disc and thus the difference Δ shown in FIG. 15 remains invariable at a preset value, the signal P can be produced with the predetermined time delay Δ relative to the signal N produced by the circuit 54, for application to the CLV system.

It should be added that the information pits and the prepits described in conjunction with the first and second embodiments of the invention may be realized in any geometrical configuration so far as they can be optically detected. For example, they can be formed with different reflectivities or in phased arrays. Besides, although it has been assumed that the reproduced signal is derived on the basis of the quantity of light reflected from the disc surface, the invention can obviously be carried out on the basis of the quantity of light transmitted through the disc.

We claim:

1. An optical information recording system for recording information on a rotatable recording medium in the form of record pits along guiding means formed in a surface of said recording medium, comprising radiation means for irradiating said recording medium with first, second and third laser beams; modulation means for modulating said first laser beam in accordance with an information signal, said first laser beam being focused along said guiding means for forming said record pits in accordance with the information signal while said second and third laser beams are focused at positions sandwiching said first laser beam in directions which are both parallel and perpendicular to said guiding means so that said second laser beam succeeds chronographically to said first laser beam in a rotating direction of said recording medium; first, second and third photoelectric elements for receiving laser light rays resulting from the irradiation of said recording medium with said first, second and third laser beams, respectively; tracking signal generating means for producing a tracking signal for causing said first laser beam to trace said guiding means in accordance with the output signals of said second and third photoelectric elements; and control means responsive to said tracking signal for controlling said first, second and third laser beams so that said first laser beam traces said guiding means; wherein said tracking signal generating means includes first means coupled to said second potoelectric element for detecting from the output signal of said second photoelectric element a signal originating in a portion of said recording medium at which said first laser beam has not recorded a record pit on said recording medium, and second means for determining a difference between the output signal of said first means and an output signal of said third photoelectric element, the output signal of said second means being applied to said control means.

2. An optical information recording system according to claim 1, wherein said first means includes third means for detecting from the information signal a pattern which represents an absence of record pits on said recording medium for a predetermined time period; fourth means for detecting a time lag of the output signal of said second photoelectric element relative to said pattern; fifth means for generating a pulse signal upon traversal of said pattern recorded on said medium by said second laser beam on the basis of the output signals of said third and fourth means; and sixth means for holding the output signal of said second photoelectric element in response to said pulse signal and for supplying the held signal to said second means.

3. An optical information recording system according to claim 2, wherein said third means includes means for periodically detecting said information signal and counting means for counting a time elapsing from the detection of said information signal by said detection means to the occurrence of said pattern; said fourth means including digitizing means for converting the output signal of said second photoeletric element into a digitized signal and means for detecting coincidence between said digitized signal and the information signal detected by said detection means; said fifth means producing said pulse signal at a time point delayed relative to the occurrence of said coincidence for said time counted by said counting means.

4. An optical information recording system according to claim 2, further including seventh means for holding the output signal of said third photoelectric element, wherein the output signals of said sixth and seventh means are applied to said second means.

5. An optical information recording system according to claim 1, wherein said guiding means includes a plurality of pits previously recorded with a constant period, said first means detecting from the output signal of said second photoelectric element only a signal level originating in said previously recorded pits.

6. An optical information recording system according to claim 5, said first means including time difference detecting a means for detecting difference in time between irradiation of said pit by said first and third laser beams on the basis of the output signals of said first and third photoelectric elements and producing a pulse signal at a time point delayed for a time corresponding to said time difference relative to the traversal of said pit by said first laser beam, first hold means for holding the output signal of said second photoelectric element in response to said pulse signal, and second hold means for holding the output signal of said third photoelectric element at a time point when said pit is traversed by said third laser beam, wherein output signals of said first and second hold means are applied to said second means.

7. An optical information recording system according to claim 6, said first means including first and second digitizing means for digitizing the output signals of said first and third photoelectric elements, respectively, wherein output signals of said first and second digitizing means are applied to said time difference detecting means, while operation of said second hold means is controlled by the output signal of said second digitizing means.

8. An optical recording system for recording information in a recording disc along predetermined recording tracks wherein a recorded area in the recording track which area is recorded with information has different optical properties than an area in the recording track which area is not recorded with information, comprising:

means for recording information at a predetermined timing in the recording track;

monitor means for monitoring the position of the recording track including a preceding and a succeeding detector means spatially disposed before and after the recording means along the recording track;

circuit means for controlling a timing of sampling of an output signal from said succeeding detector so as to detect a monitor signal in the interval of said predetermined timing, and holding the sampled signal;

means for comparing the output of said preceding detector and the sampled signal to produce a signal for enabling control of the positioning of the recording means.

* * * * *